United States Patent
Ziegler

[11] Patent Number: 4,771,229
[45] Date of Patent: Sep. 13, 1988

[54] CIRCUIT ARRANGEMENT FOR AUTOMATIC CONNECTION OF THE REMOTE FEED CURRENT PATHS OF A REMOTE FEED LOOP

[75] Inventor: Alfred Ziegler, Munich, Fed. Rep. of Germany

[73] Assignee: Siemens Aktiengesellschaft, Berlin and Munich, Fed. Rep. of Germany

[21] Appl. No.: 60,339

[22] Filed: Jun. 10, 1987

[30] Foreign Application Priority Data

Jun. 13, 1986 [DE] Fed. Rep. of Germany ....... 3619858

[51] Int. Cl.⁴ .............................................. H04B 3/44
[52] U.S. Cl. .................................... 323/909; 379/338; 379/348; 340/425; 361/62; 361/63
[58] Field of Search .............. 323/909; 379/338, 348, 379/412, 413; 340/425; 307/77, 85, 86; 361/187, 62, 63

[56] References Cited

U.S. PATENT DOCUMENTS

| | | | |
|---|---|---|---|
| 2,260,160 | 10/1941 | Benning et al. | 340/425 X |
| 3,082,300 | 3/1963 | Partridge | 340/425 X |
| 3,868,484 | 2/1975 | Bolton et al. | 379/348 X |
| 4,202,024 | 5/1980 | Simokat | 340/425 X |
| 4,309,577 | 1/1982 | Kraicar et al. | 379/348 X |
| 4,362,952 | 12/1982 | Ziegler | 340/425 X |
| 4,459,491 | 7/1984 | Ziegler | 379/338 X |
| 4,462,058 | 7/1984 | Ziegler | 361/62 |

FOREIGN PATENT DOCUMENTS

| | | | |
|---|---|---|---|
| 0007626 | 2/1980 | European Pat. Off. | 379/348 |
| 2948269 | 6/1981 | Fed. Rep. of Germany | 379/348 |
| 2948335 | 6/1981 | Fed. Rep. of Germany | 379/348 |
| 3003515 | 8/1981 | Fed. Rep. of Germany | 379/348 |
| 3425533 | 1/1986 | Fed. Rep. of Germany | 379/348 |

*Primary Examiner*—Patrick R. Salce
*Assistant Examiner*—Emanuel Todd Voeltz
*Attorney, Agent, or Firm*—Hill, Van Santen, Steadman & Simpson

[57] ABSTRACT

In a circuit arrangement for automatic connection of a remote feed current path of a remote feed loop fed from both sides for electrical loads with direct current series feed, a parallel circuit of a first four-terminal network comprising two feed outputs and a second four-terminal network containing a connecting two-terminal network, controllable by current sensors, is provided for the acquisition of a feed output per remote feed current path, this being undertaken by way of diode current branches. The circuit arrangement can advantageously be employed for the remote feed of regenerators and communications transmission links.

10 Claims, 6 Drawing Sheets

CIRCUIT ARRANGEMENT FOR AUTOMATIC CONNECTION OF THE REMOTE FEED CURRENT PATHS OF A REMOTE FEED LOOP

BACKGROUND OF THE INVENTION

1. Field of the Invention

What are referred to as switch auxiliaries can be provided in intermediate repeater locations of communications transmission links, in stations of remote control devices or in conjunction with remotely-fed loads of some other type, these switch auxiliaries connecting the remote feed current paths to one another as soon as the remote feed current drops below a prescribed minimum value. In case of an interruption of the remote feed loop, the respective section from the remote feed current source up to the switch auxiliary placed in front of the interrupt location therefore continues to remain in operation. When an interruption of the communications transmission link and, therefore, of the remote feed loop, as well, occurs in a communications transmission equipment, then the respective link portion up to the faulty repeater section remains in operation, so that this can be identified by way of a system-internal fault locating means. In the intermediate locations, for example, such a fault locating means can contain assigned frequency generators and can contain an equipment for evaluating and displaying the received assigned frequencies in the terminal station or stations.

SUMMARY OF THE INVENTION

The present invention relates to a circuit arrangement for automatic connection of the remote feed current paths of the remote feed loop which is fed at both sides by way of a first remote feed source and a second remote feed source. In the case of an interruption, the remote feed loop, for remote feed facilities for feeding electrical loads by way of direct current series feed, a feed output for connecting at least one of the remotely-fed loads lies in one of the two remote feed paths and a connecting two-terminal network is arranged in a shunt arm arranged between the two remote feed current paths, the connecting two-terminal network being capable of being switched on or off by a switch which is controllable by way of two current sensors, whereby the current sensors are arranged in respectively one of two two-terminal networks lying in one of the remote feed current paths of which a first two-terminal is arranged between the first remote feed current source and the feed output and the section is arranged between the second remote feed current source and the feed output and the switch is controllable by the two current sensors such that the switch is closed given at least one currentless current sensors and that the switch is opened in the case of one of the current sensors carrying the remote feed current and the other current sensor carries a current exceeding a prescribed minimum value.

Such a current arrangement or, respectively, such a switch auxiliary is already disclosed in the German patent No. 30 03 515, fully incorporated herein by this reference. The known switch auxiliary is provided for communications transmission links which are remotely fed proceeding from both terminal stations. Independently of the energy flow direction, the switch auxiliary always connects the shunt arm in the intermediate repeater location which is located preceding the interrupt location. The loop closure is thereby produced by way of the shunt arm such that the load located at that position continues to remain supplied with remote feed current.

The known switch auxiliary contains a relay comprising a normally-closed contact which is arranged in the shunt arm and which produces the desired loop closure given an interrupted remote feed loop. The relay has two excitation windings which are arranged at both sides of the shunt arm in one of the two remote feed current branches and which serve as current sensors. The other remote feed current path is loaded by one or more loads. An asymmetrical loading of the remote feed loop thereby occurs at the location of the switch auxiliary.

Furthermore, the German published application No. 29 48 269, fully incorporated herein by this reference, discloses a circuit arrangement for remote feed of intermediate locations of an equipment of communications transmission technology in which the output voltage of a feed location is monitored. The polarization of the two output sub-voltages respectively related to reference potential are thereby monitored at the output of the feed location. A repolarization of at least one of the two output sub-voltages serves as a criterion for a fault report. In this manner, it is possible to monitor the insulation of the remote feed circuit. Switch auxiliaries are thereby not provided. If such auxiliaries, as are disclosed in the German published application No. 30 03 515, fully incorporated herein by this reference, are thereby arranged in the remote feed loop, such that the loads are ultimately looped into one or the other remote feed current path, then an only approximately symmetrical loading of the remote feed current paths occurs, this potentially leading to a response of this monitoring.

The aforementioned German published application No. 30 03 515 further discloses a circuit arrangement for remote feed in which, in conjunction with a switch auxiliary, respectively two loads are looped into respectively one of the two remote feed current paths. The switch auxiliaries thereby employed are suitable only for remote feed loops fed at one side.

SUMMARY OF THE INVENTION

The object of the present invention is to provide a circuit arrangement of the type set forth above such that loads can be inserted into both remote feed current paths and such that only one connecting dipole, controllable by current sensors, is thereby required for producing a loop closure in the circuit arrangement. In particular, an optimally-symmetrical loading of the remote feed current paths should be possible in conjunction with the circuit arrangement.

Two switch auxiliaries can be provided in every load location such that respectively one is arranged preceding and one is arranged following the loads.

According to the present invention, the above object is achieved, in a circuit arrangement of the type set forth above which is particularly characterized in that, for the acquisition of a feed output per remote feed current path, a first four-terminal network is provided in which the terminals of an input terminal pair are connected to one another and to an output terminal pair by way of two series arms each composed of a feed output. The connecting two-terminal network is arranged in a shunt arm of a second four-terminal network which contains two series arms each of which connects one of the two input terminals directly to one of the two output terminals. The first four-terminal network and the second four-terminal network have their inputs and their outputs connected in parallel to one another by way of two respective diode current branches which are polarized such that each diode current branch is conductive for the current of the feed current source lying at the opposite side of the four-terminal networks and is inhibited for the current of the remote feed source lying at the same side of the four-terminal networks.

The circuit arrangement deriving on the basis of the aforementioned measures is in the position, given occupation of both remote feed current paths with loads, to always produce the loop closure such that the shunt connection is closed following the load inputs as seen in each energy flow direction and such that the current sensor monitoring the interrupted remote feed section is located between the shunt connection and the interrupted remote feed section. The circuit arrangement can also be utilized in remote feed facilities having single-sided remote feed and/or asymmetrical loading.

When the second four-terminal network is connected to the diode current branches to provide a structure in that the second four-terminal network is connected to the diode branches such that the series arms at both sides are respectively connected to diode terminals of non-identical sign, the direction of the current flow in the connecting two-terminal network is dependent on the feed location from which the current derives.

When, in accordance with a further feature of the invention, the circuit arrangement is constructed such that the second four-terminal network is connected to the diode branches such that the series arms at both sides are respectively connected to diode terminals of the same sign, the current which may potentially flow through the connecting two-terminal network always has the same polarity.

In accordance with another feature of the invention, the two current sensors are formed by windings of a relay and the controllable switch arranged in the connecting two-terminal network is formed by normally-closed contacts of the relay. The windings are connected such that they generate linkages of the same direction and the number of turns of the two windings are at least dimensioned of approximately the same magnitude.

With this structure, both current sensors are formed by windings of one and the same relay, whereby respectively one winding effects a premagnetization of the relay. A switch auxiliary comprising a premagnetized relay is known per se from the German patent No. 30 03 515. In the embodiment intended for remote feed loops having two-sided feed, however, the known switch auxiliary comprises an asymmetrical loading of the two remote feed current paths.

Tolerances which are unavoidable in the manufacture of the relay can be compensated in a simple manner in a circuit arrangement of the type set forth above in that a respective balancing resistor is arranged parallel to a winding.

An advantageous embodiment of the invention, in which a semiconductor circuit suitable for switching unipolar currents serves as a connecting two-terminal network in combination with some of the features set forth above in which the second four-terminal network is connected to the diode branches such that the series arms at both sides are respectively connected to diode terminals of the same sign, is further characterized in that the controllable switch is formed by a semiconductor switch suitable for switching unipolar currents, and in that the current sensors are formed by optocouplers which have their diode portions lying in the two-terminal networks and whose emitter-collector paths are arranged in series with one another. A further advantageous embodiment of the invention is also based on the same primary structure which is particularly characterized in that the two-terminal networks each contain a dropping resistor arranged in series with the current sensor and each contain a voltage limiter arranged in parallel to the series circuit composed of the current sensor and the dropping resistor. In this construction, the value of resistance of the dropping resistor and the threshold of the voltage at which the voltage limiter takes effect are dimensioned such that the voltage limitation is effective at the nominal value of the remote feed current and is not yet effective at the lower limit value of the current that initiates the electronic switch to open the normally-closed contact.

What is of particular advantage is that the design of the connecting two-terminal network can be based on a prescribed current direction without an interposition of a rectifier bridge being required for this purpose.

Advantageous measures with which an effective protection of the current sensors against voltage voltages can be achieved without deteriorating the function of the current sensors in a circuit arrangement which is particularly characterized in that the two-terminal networks contain a dropping resistor connected as set forth immediately above. The circuit arrangement is further particularly characterized in that the dropping resistor is dimensioned such that, at the response value of the electronic switch, the voltage drop at the series circuit is roughly equal to half the value of the threshold voltage of the voltage limiter.

According to another feature of the invention, the circuit arrangement may be particularly characterized in that a respective winding of a relay comprising a normally-close contact is arranged in the load four-terminal network in series with the feed outputs and the respective normally-closed contact of the relay is arranged parallel to the feed inputs, and in that the response value of the relay is respectively dimensioned such that a response given a current which is lower by a prescribed amount than the nominal value of the remote feed current. This provides the advantage that even given a feed of direct current/direct voltage converters, it is assured that the switch auxiliaries encounter a defined, low-impedance resistance when checking the next, following remote feed station.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
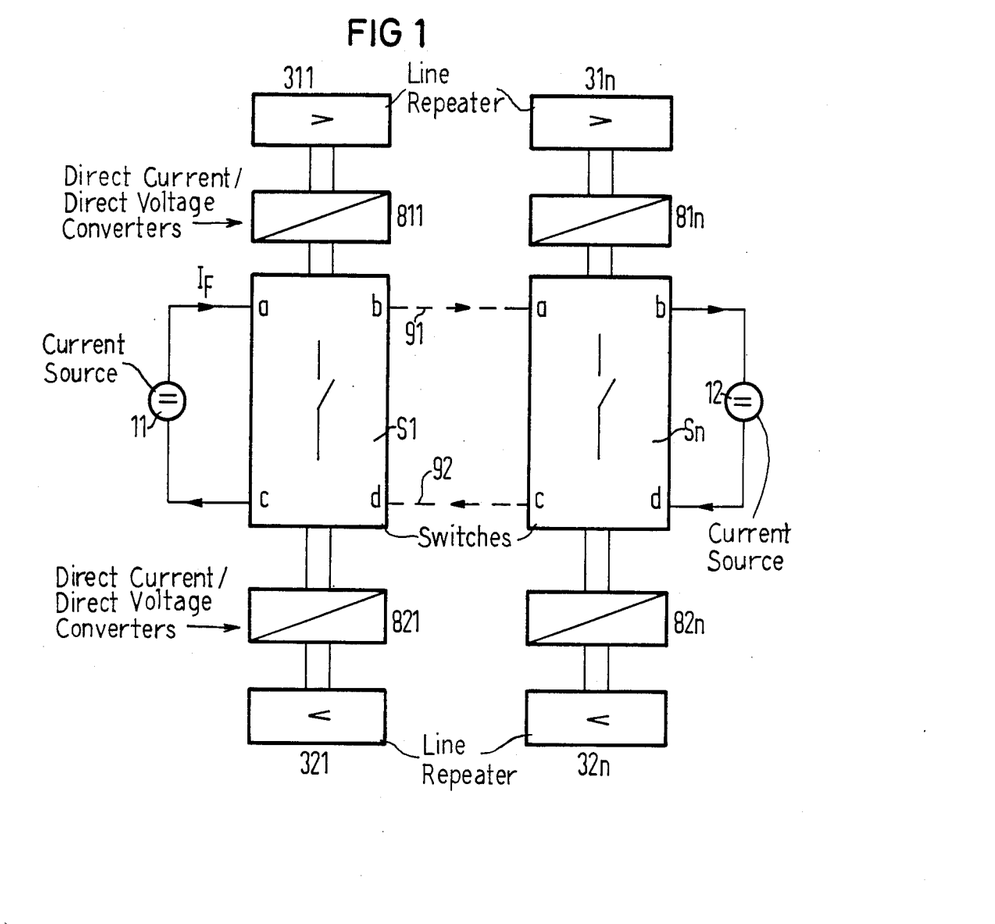
FIG. 1 is a schematic representation of a remote feed device which is provided with switch auxiliaries and which is symmetrically loaded with loads.

In accordance with FIG. 1, a plurality of loads, formed by intermediate stations of a communications transmission facility, are fed with constant direct current $I_F$ by way of a serial feed. Two loads are provided in each load location formed by an intermediate station comprising regenerators and/or repeaters, the input of these two loads being respectively traversed by remote feed current $I_F$. The loads are a respective line repeater 31l, 32l; ... 31n, 32n. The line repeaters are fed by way of a direct current/direct voltage converter 81l, 82l; .. . 81n, 82n. These converters can be omitted under given conditions.

The loads are operated in a series circuit in a remote feed circuit. A respective load lies in each of the remote feed current paths in each intermediate station in order to achieve a uniform load distribution or, respectively, in order to achieve a compensation of hum or ripple modulation of the remote feed current in the case of an influence due to induced alternating currents on the link. The uniform loading distribution is particularly advantageous when a device for symmetry monitoring, with which a connection to ground in the remote feed circuit, can be identified is provided in the feed location or in one of the feed locations.

The remote feed current paths 91 and 92 have both ends connected to a remote feed current source 11 or, respectively, 12, so that a two-sided feed, with simultaneously-existing apparatus redundancy, occurs. A series connection of the two remote feed current sources 11 and 12 is thereby effective in the remote feed circuit. Each of these two remote feed current sources 11 and 12 is in the position to supply the entire remote feed path based on the principle referred to as "hot reserve".

As soon as connection between the remote feed current paths 91 and 92 occurs, the remote feed current source 11 feeds to this location. The remote feed current source 12 likewise feeds to the connecting location, so that the entire length continues to remain supplied.

An interruption-free operation of the intermediate locations, even given an interruption at an arbitrary location of the remote feed circuit, is achieved in that a switch S1 or, respectively, Sn is provided in each intermediate location, the switch, given an interruption of one or both remote feed current paths 91 or, respectively, 92 closing the remote feed circuit in front of the interruption location, such that the loads in the intermediate locations continue to be supplied.

After the elimination of the interruption, the lead connection at the switch is automatically canceled.

At the one side, the switch is inserted into the remote feed circuit with the terminals a and c and is inserted into the remote feed circuit with the terminal b and d at the other side.

Figure 2:
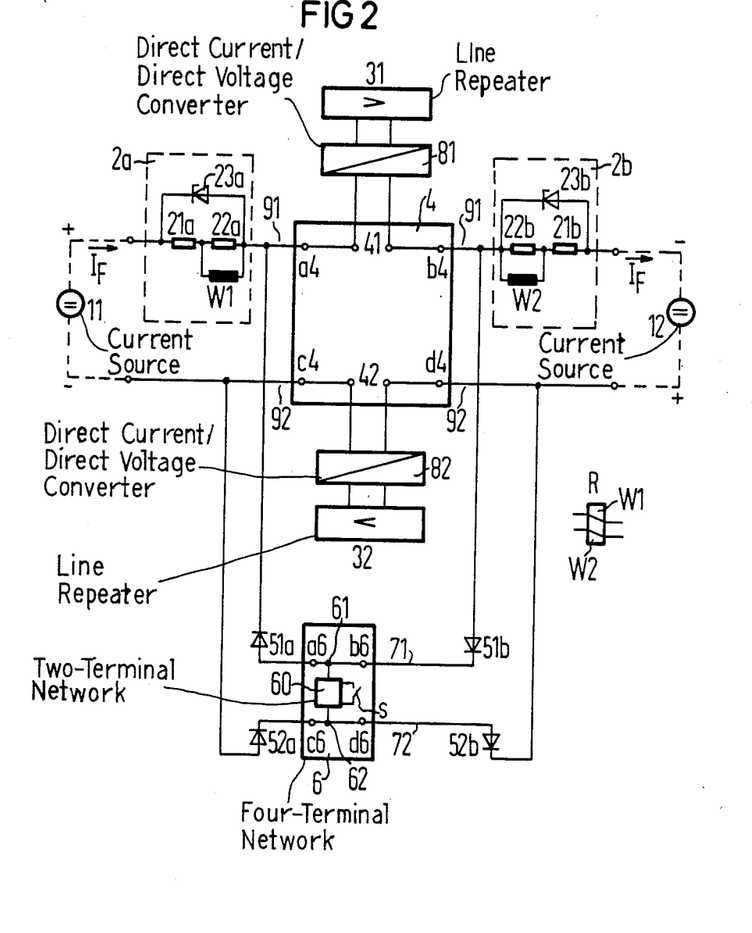
FIG. 2 is a schematic representation of a switch auxiliary having a polarity of current flowing in the shunt arm which is dependent on feed direction.

The switches S1 ... Sn are constructed in the same manner. FIG. 2 illustrates a switch comprising the details of such a structure. What is to be understood in the present context by a switch is a circuit arrangement for automatically connecting the remote feed current path 91 and 92, this producing a back-up loop closure in case the operational remote feed loop is interrupted.

The switch illustrated in FIG. 2 contains the four-terminal networks 4 and 6.

The first four-terminal network 4 has a pair of input terminals a4, c4 and a pair of output terminals b4, d4. The terminals a4 and b4 are connected to one another by way of a series arm formed by the feed output 41. A series arm composed of the feed output 42 lies between the terminals c4 and d4. The switch therefore has one feed output per remote feed current path.

The line repeater 31 has its supply voltage input connected to the feed output 41 lying in the remote feed current path 91. The supply voltage input of the line repeater 32 is connected to the feed output 42 lying in the remote feed current path 92.

The second four-terminal network contains the two series arms 61 and 62. The series arm 61 connects the input terminal a6 directly to the output terminal b6. The input terminal c6 and the output terminal d6 are directly connected to one another via the series arm 62. The two-terminal network 60 is arranged in a shunt arm lying between the two series arms, this connecting two-terminal network 60 being capable of being switched optionally on or off or, respectively, into a conductive condition or an inhibited condition with the assistance of a switch connected to the control input s, this switch being formed in the illustrated manner by the normally-closed contact r of a relay R.

In the activated condition, the two remote feed current paths are connected to one another by way of the conductive two-terminal network, so that a back-up remote feed circuit is closed, just as, under given conditions, at the other side of an interruption location. In the deactivated condition, the two-terminal network is inhibited and the remote feed current flows by way of the operational remote feed loop.

The first four-terminal network 4 and the second four-terminal network 6 have their inputs and their outputs connected parallel to one another by way of diode current branches. The diode branch 51a lies between the terminal a4 and a6. The diode current branch 52a lies between the terminal c4 and c6. The diode current branch 51b lies between the terminal b4 and b6, and the diode current branch 52b lies between the terminals d4 and d6.

The diode current branches 51a and 52a are polarized such that they are conductive for a current that comes from the remote feed current source 12 and flows by way of the connecting two-terminal network 60 and are inhibited for a current that comes from the remote feed current source 11 and were to flow via the connecting two-terminal network 60. The diode current branches 51b and 52b are polarized such that they are conductive for a current that comes from the remote feed source 11 and flows by way of the two-terminal network 60 and are inhibited for a current that would come from the remote feed source 12 and would flow by way of the two-terminal network 60.

The four-terminal network 60 has its terminals a6 and c6 directly connected to the diode current branches 51a or, respectively, 52a. The terminals b6 and d6 of the four-terminal network 6 are brought together with the diode current branches 51b and 52b by way of two direct connections 71 and 72. The second four-terminal network 6 is thereby connected to the diode current branches 51a, 52a, on the one hand, and 51b, 52b, on the other hand, such that the series arms 61 and 62 of the second four-terminal network 6 are respectively connected at both sides to diode terminals of non-identical sign. In the illustrated embodiment, the cathode of the diode 51b is connected to the anode of the diode 51a by way of the series arm 61 and the cathode of the diode 52a is connected to the anode of the diode 52b via the series arm 62. What thereby occurs is that the direction of the current which may flow by way of the connecting two-terminal network 60 can differ, dependent on the feeding from the feed location.

The two-terminal network 60, lying between the two series arms 61 and 62 of the four-terminal network 6 is switched into a conductive or to an inhibited condition by the two windings W1 and W2 which serve as current sensors.

The winding W1 is contained in the two-terminal network 2a and the winding W2 is contained in the two-terminal network 2b. The two-terminal network 2a and 2b lie at both sides of the four-terminal network 4 in the remote feed current path 91. The first two-terminal network 2a is arranged between the first remote feed current source 11 and the feed output 41. The second two-terminal circuit 2b lies between the second remote feed source 12 and the feed output 41.

In a modification of the circuit arrangement illustrated in FIG. 2, both two-terminal networks 2a and 2b can potentially lie in different remote feed paths 91, 92.

The normally closed contact r of the relay R is closed given at least one currentless winding W1 or, respectively, W2. When one of the windings W1 and W2 carries the remote feed current $I_F$ and the other identifies a current which is at least equal to the prescribed minimum value at which the following section of the remote feed current is intact, the relay R responds and the normally-closed contact r opens.

The windings of the relay R are inserted into the remote feed current path 91 such that they generate linkages of the same direction.

The number of turns of the two windings W1 and W2 are identical.

A respective balancing resistor 22a or, respectively, 22b is arranged parallel to each of the windings W1 or, respectively, W2. The two-terminal networks 2a and 2b each contain the parallel circuit composed of a winding and a balancing resistor, as well as a dropping resistor 21a or, respectively, 21b arranged in series with the respective parallel circuit. A respective Zener diode 23a or, respectively, 23b is connected in parallel with the series circuit. Some other threshold circuit, particularly one or more diodes, can respectively replace the Zener diode.

The value of resistance of the drop resistor 21a or, respectively, 21b and the Zener voltage of a Zener diode are each dimensioned such that the voltage limitation is effective at the nominal value of the remote feed current $I_F$ and is not yet effective at the current which allows the response current of the relay to flow in the winding W1 or, respectively, W2.

The size of the dropping resistor 21a or, respectively, 21b and of the threshold of the threshold circuit are matched to one another such that, first of all, the voltage drop at the series circuit occurring given response of the relay R lies adequately below the threshold voltage of the threshold circuit, given a closed shunt arm or, respectively, a current-conductive two-terminal network 60, and, on the other hand, the threshold voltage at that side of the four-terminal network 4 carrying the full remote current feed $I_F$ which results in such a high current component through the series circuit that a defined premagnetization of the relay R occurs. This arrangement simultaneously protects the relay R against an overexcitation, particularly due to influencing currents or due to currents which occur due to a filter capacitance contained in the current-supplying feed device when the normally-closed contact r closes the shunt arm following an interruption occurring at the beginning of the remote feed path and therefore connects the shunt arm.

Since the response excitation of the relay R for various units can differ in magnitude within a tolerance range, it is advantageous to connect a resistor 22a, 22b parallel to each winding, this resistor being selected of such a magnitude that a uniform response current is obtained.

Unchanging preconditions therefore also occur for the premagnetization. The dropping resistor 21a or, respectively, 21b only has to compensate the significantly smaller resistance tolerances of the parallel circuits comprising a winding and a parallel balancing resistor, balancing these elements such that the same overall resistance is always obtained for the series circuit. This overall resistance forms a load at which the limitation of the voltage due to the value of the threshold voltage of the threshold circuit occurs. One or two diodes arranged in series with one another can be adequate for generating the threshold voltage.

It is advantageous to select the dropping resistor 21a or, respectively, 21b such that the voltage drop at the series circuit traversed by the pick-up current $I_A$ amounts to only about half the value of the Zener voltage of the Zener diode 23a or, respectively, 23b or, respectively, of the threshold voltage of the threshold circuit. In this case, the premagnetization current $I_V$ in the other winding is about $I_V = 2 \times I_A$. Given this dimensioning, one expediently proceeds on the basis of the highest response excitation of the relay R in the tolerance range, i.e. without taking the parallel resistor 22a or, respectively, 22b into consideration. Proceeding on the basis of the constant maximum value of the response excitation for a specific relay structure, and on the basis of the resistance factor $A_R$, the number of turns $$w = \phi_A / 3 I_A$$

is obtained for every winding and the winding resistance $$R_w = 2 A_R \cdot w^2$$

derives therefrom. With the threshold voltage Us of the threshold circuit, $$R_v = U_s / 2 I_a - (R_w)$$

derives for the dropping resistance. For example, given $$I_A = 50 \text{ mA}$$

$$\phi_{Amax} = 80 \text{ A}_w,$$

$$A_R = 10 / w^2$$

and Us=2×0.8 V, a number of turns w=533, a winding resistance Rw=5.7 ohms and a dropping resistance R$_v$=10.3 ohms occur.

If, in this example, a relay R were already to respond at a response excitation $\phi$=60 AW, then each winding would have to have a resistance R$_p$=17.1 ohms connected in parallel therewith in order to also arrive at 150 mA response current therefore, whereby the effective overall resistance of the parallel circuit is reduced to an effective winding resistance R'$_w$=4.3 ohms. Correspondingly, the dropping resistance R'$_v$ will then be 11.7 ohms.

The opening of the normally-closed contact r is initiated by the addition of the magnetic sub-excitations by way of the two windings of the relay R, i.e. by a logical AND condition when the current in the outgoing remote feed path corresponds to or exceeds the response value.

Figure 3:
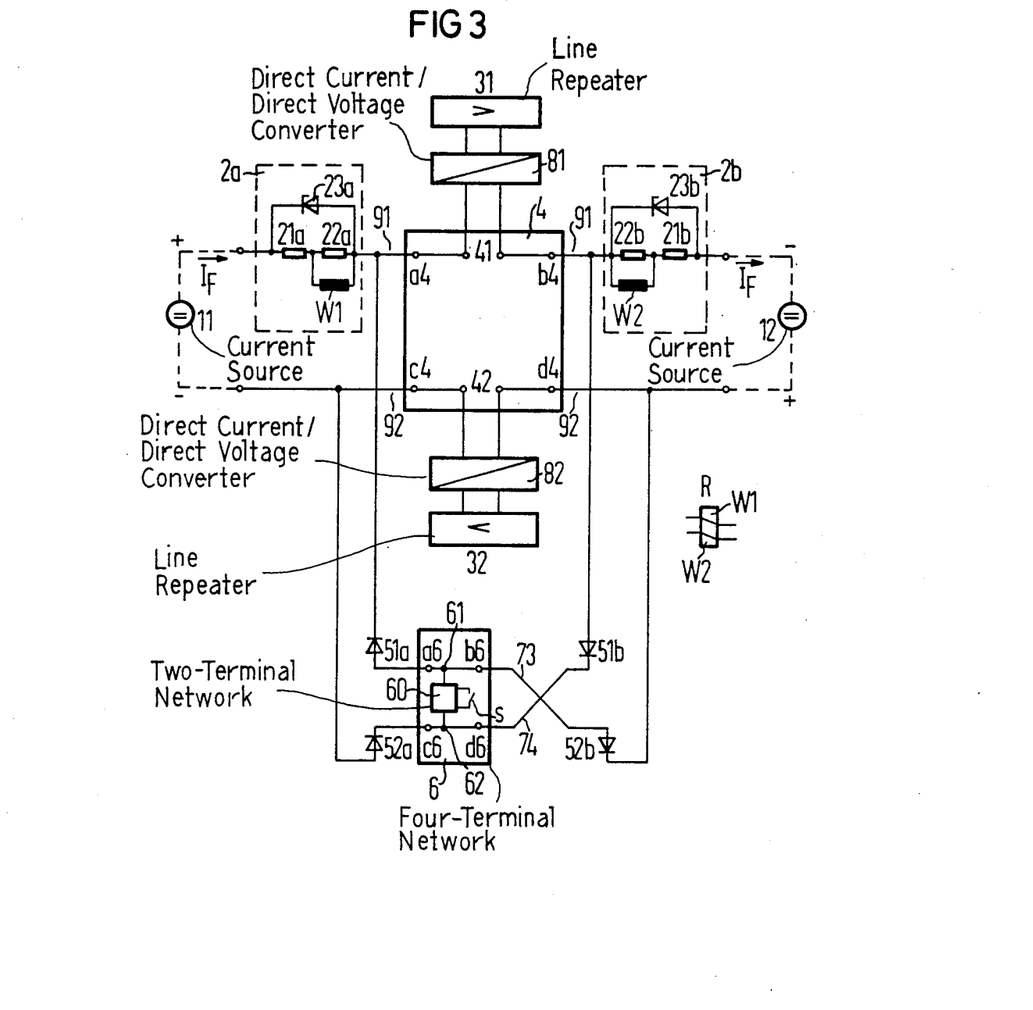
FIG. 3 is a schematic representation of a switch auxiliary having a polarity of the current flowing in the shunt arm which is independent of feed direction.

The switch illustrated in FIG. 3 largely coincides with that of the switch illustrated in FIG. 2. The only difference is in the manner in which the second four-terminal network 6 is connected to the diode branches 51a, 51b, 52a and 52b. The second four-terminal network 6 is connected to the diode current branches 51a, 52a by way of the direct connection 73 and 74 such that the series arms 61, 62 at both respective sides are connected to terminals of the same of the same sign at the diodes 51a and 52b or, respectively, 52a and 51b. Thereby occurring is that the direction of the current potentially flowing by way of the two-terminal network is always the same.

In the illustrated exemplary embodiment, the crossed connections 73 and 74 lie between the second four-terminal network 6 and the diode branches 51b and 52b. The same result is achieved when the crossed connections are instead arranged between the diode current branches 51a and 52a and the second four-terminal network 6 and the terminals b6 and d6 in accordance with FIG. 2 are connected to the diode current branches 51b and 52b by way of the connections 71 and 72.

The two-terminal network 60 of the circuit arrangement of FIG. 2 must be suitable for both current directions. For example, it is composed of a series circuit comprising the relay contact r and resistor and/or a choke. When an arrangement which is suitable for only one current direction, particularly the connecting two-terminal network shown in FIG. 4 and FIG. 6 can be employed for this purpose.

Figure 4:
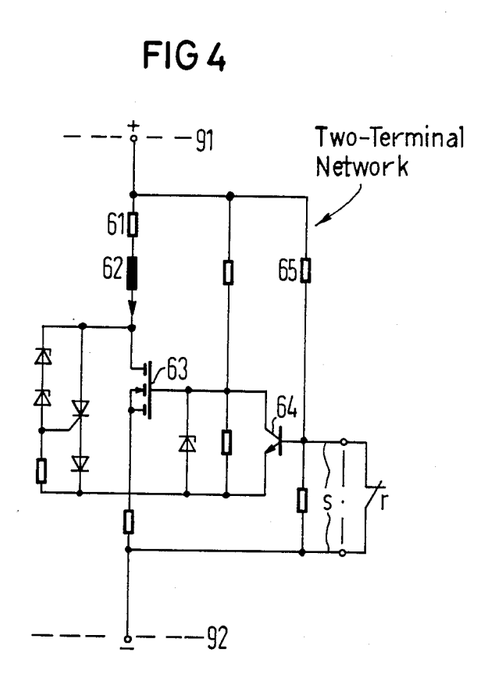
FIG. 4 is a schematic representation of a connecting branch comprising a semiconductor switch.
Figure 6:
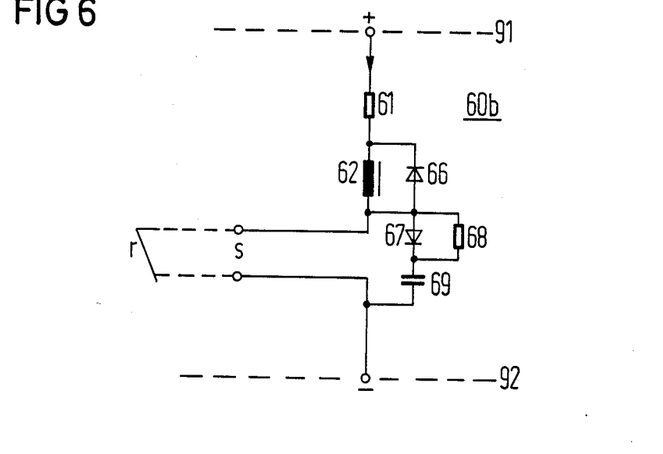
FIG. 6 is a schematic representation of a connecting branch comprising a choke-diode structure.

In comparison thereto, the circuit arrangement of FIG. 3 has the advantage that connecting two-terminal networks, which are suitable for only one current direction, particularly the connecting two-terminal network shown in FIG. 4 and FIG. 6, can be employed as such.

FIG. 4 illustrates the exemplary embodiment of the connecting two-terminal network 60 in FIG. 2 and 3. A semiconductor switch, controlled by the auxiliary closed contact r of a relay, serves as the connecting two-terminal network. Apart from the manner in which the transistor 64 is driven, this semiconductor circuit is disclosed in the German patent No. 34 25 535, fully incorporated herein by this reference. The shunt arm which potentially produces the loop closure contains a field effect transistor 63 whose drain-source path lies in series with a choke 62 and with a resistor 61. The field effect transistor 63 is driven by way of the bipolar transistor 64 whose base is connected by way of a respective resistor to each of the two remote feed current paths 91 and 92. The normally closed contact r is connected in parallel with the base-emitter path of the transistor 64.

A further example of a connecting two-terminal network of the switch constructed as a semiconductor circuit may be seen in the German patent No. 34 25 533, fully incorporated herein by this reference.

When the loop closure is produced by way of a semiconductor circuit forming the shunt arm of the switch or lying in the shunt arm, then the normally-closed contact r, advantageously need not be designed for high voltages and/or breaking capacities. In particular, a contact protection for the normally-closed contact r of the relay can be potentially omitted. Moreover, only the dielectric strengths between windings and contact need be taken into consideration when constructing the relay.

Figure 5:
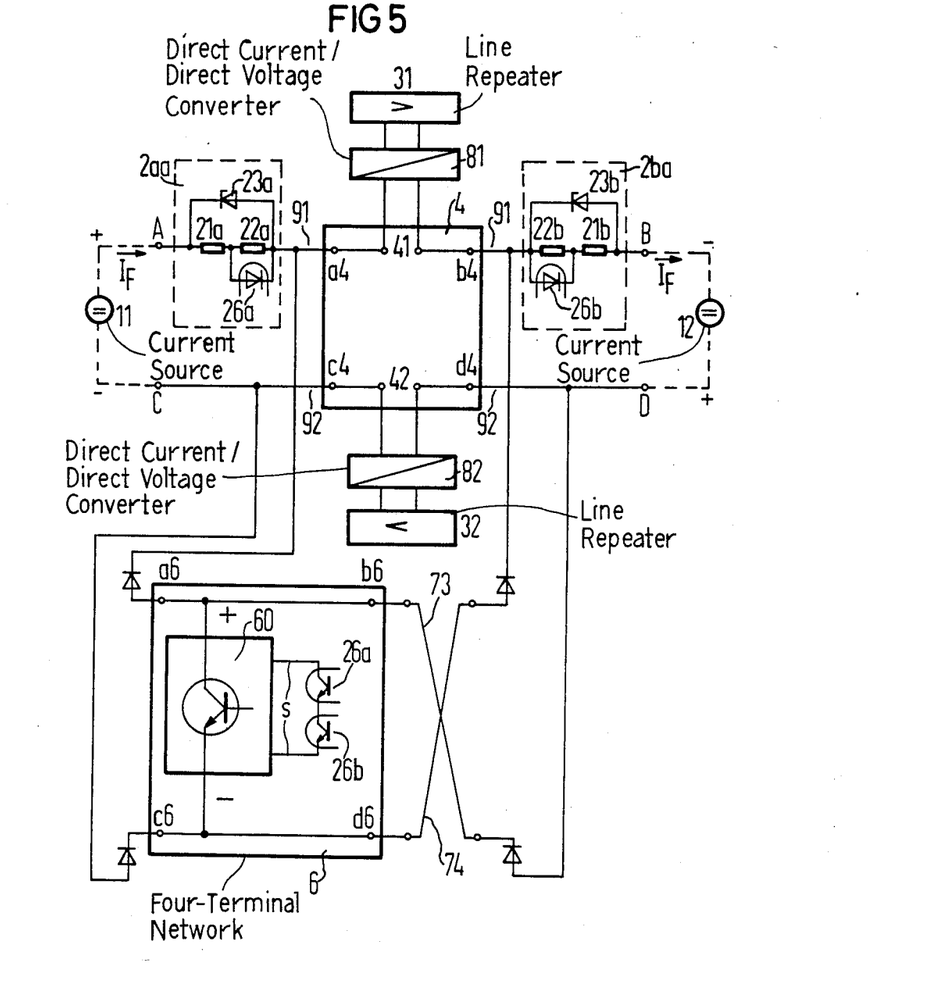
FIG. 5 is a schematic representation of a switch auxiliary comprising a semiconductor switch in the shunt arm.

FIG. 5 illustrates a switch wherein the connecting two-terminal network 60, constructed as a semiconductor circuit, for example in accordance with FIG. 4, is controlled in an electronic manner. Optocouplers are shown as an example of an electronic control, these being preferably utilized because of the voltage separation therewith achieved. Proceeding on the basis of the switch of FIG. 3, the diodes D1, D2 of the optocouplers 26a and 26b serve as current sensors instead of the windings. These diodes lie in the two-terminal networks 2aa and 2ba. The emitter-collector paths and the optocouplers lie in series with one another at the control input s of the connecting two-terminal networks 60.

The diodes of the optocouplers replace the windings of the relay R and are connected to the resistors 21a, 22a, or, respectively, 21b, 22b, as well as to the Zener diodes 23a or, respectively, 23b that the major portion of the remote feed current flows by way of the Zener diodes 23a or, respectively, 23b and the diodes D1 and D2 of the optocouplers only carry a portion of the remote feed current which lies in an allowable magnitude. This limitation is not yet effective for the significantly-lower current which leads to an inhibiting of the connecting two-terminal network 60, given a test of the outgoing remote feed lines.

The series circuit of the transistor paths of the optocouplers 26a and 26b forms a logical AND condition for driving the two-terminal network 60. For example, it is inserted into the connecting two-terminal network shown in FIG. 4 instead of the transistor 64. The connecting two-terminal network is inhibited when both current sensors identify a current which reaches or exceeds the response value.

The connecting two-terminal network shown in FIG. 6 contains diodes which require the illustrated polarity of the current flowing in the shunt arm. Given a switch of FIG. 2, the connecting two-terminal network can be inserted into the second four-terminal network 6 by way of a rectifier bridge and, given a switch of FIG. 3, can be directly inserted into the second four-terminal network 6. The choke 62, comprising the diode 66 as well as the arrangement comprising the capacitor 69, the diode 67 and the resistor 68 form a known, optimum protection for the normally-closed contact r when closing and opening.

Figure 7:
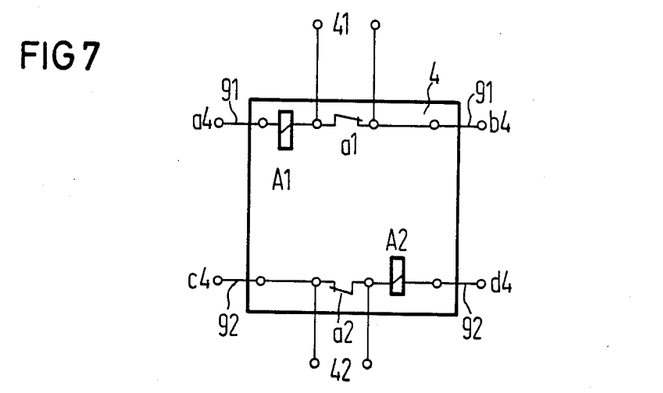
FIG. 7 is a schematic representation of a four-terminal network of a switch auxiliary comprising relay-controlled, shortable load outputs.

Given the first four-terminal network 4 shown in FIG. 7, a winding of a relay A1 is connected in series with the feed output 41 and a normally-closed contact a1 of the relay A1 is connected in parallel to the feed output 41. Furthermore, a winding of a relay A2 is connected in series with the feed output 42 and a normally-closed contact a2 of the relay A2 is connected in parallel to the feed output 42. The response value of the relay A1 or, respectively, the relay A2 is dimensioned such that there is a response at a current which is smaller by a prescribed amount then the nominal value of the remote feed current $I_F$.

The loop resistance of the next, following remote feed section is the determining factor for opening the shunt arm in the connecting two-terminal network 60. When direct current/direct voltage converters are provided at the feed outputs 41, 42 for supplying different operating voltages, then, given the test voltage of, for example, only 40 V applied at the shunt arm of the switch, the input resistance of the converters in the next, following feed section can be so high that the loop resistance of the next, following remote feed section exceeds a value of, for example, 2000 ohms defined as human body resistance upon contact. Given such high resistances, however, the current sensors should not respond since, if exposed feed leads forming the remote feed current paths 91, 92 are touched, an opening of the shunt arm is possible and personal protection would no longer be guaranteed at the interruption location.

In order to also assure a defined, low-impedance resistance at the next, following remote feed section, given the remote feed of such converter inputs, the input of the load is bridged in each remote feed current path 91, 92 with the normally-closed contact a1, a2 of the respective relay A1, A2. The excitation winding of each of the relays A1, A2 lies in front of the load input in the remote feed path, as viewed in the current direction. The relay A1, or, respectively, A2 opens its normally-closed contact a1 or, respectively, a2, only when the remote feed current $I_F$ has nearly reached its rated value. This, however, is only the case when the shunt arm or, respectively, connecting two-terminal network in the preceding intermediate location has already been opened.

Given direct current/direct voltage converters, the arrangement shown in FIG. 7 also has the advantage that, when the input is enabled, the response of the converter does not begin until nearly fully magnitude of the remote feed current $I_F$.

The arrangement is particularly suited for facilities for remote feed of intermediate regenerators on PCM communications transmission links comprising optical fiber cables whose power supply inputs are operated with constant current by way of a separately-laid remote feed cable.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

We claim:

1. A circuit arrangement for automatic connection of remote feed current paths of a remote feed loop fed at respective ends by first and second remote feed current sources in response to an interruption of the remote feed loop, for remote feed facilities for feeding electrical loads by way of direct current series feed, comprising:

first and second remote do feed current sources and a feed loop connecting said sources and a plurality of loads connected to said feed loop, said feed loop including two remote feed current paths;

first and second two-terminal networks each including first and second terminals connected in said loop, said first terminal connected to a respective remote feed current source, and including respective current sensors;

switching means connecting said loads in said loop, said switching means comprising a four-terminal network including a pair of input terminals connected in said loop, a pair of output terminals connected in said loop and a pair of feed branches connected to respective ones of said loads, said switching means further comprising a second four-terminal network connected in parallel with said first four-terminal network and connected to and controlled by said pair of current sensors such that said switching means is closed in response to at least one currentless current sensor and is opened in response to one of said current sensors carrying the remote feed current and the other current sensor carrying a current exceeding a predetermined minimum value;

said second four-terminal network including a third two-terminal network connected across the parallel connection of said first and second four-terminal networks and including two series arms each of which connects one of the two input terminals directly to a respective one of the two output terminals; and a pair of diode current branches connecting said inputs and outputs of said first and second four-terminal networks in parallel, said current branches including diodes poled to be conductive for the current of said remote feed current sources at opposite sides of said four-terminal networks and to be non-conductive for the current of the remote feed current source at the same respective side of the four-terminal networks.

2. The circuit arrangement of claim 1, wherein:
said second four-terminal network is connected to said diode branches such that the series arms at both sides are respectively connected to diode terminals of non-identical polarity.

3. The circuit arrangement of claim 1, wherein:
said second four-terminal network is connected to said diode branches such that said series arms at both sides are respectively connected to diode terminals of the same polarity.

4. The circuit arrangement of claim 1, wherein:
said current sensors each comprise a respective winding of a relay;
said controllable switch in said two-terminal network comprises a normally-closed contact of said relay; and
said windings of said relay are connected such that they generate magnetic fields of the same direction; and
each of said windings has a predetermined number of turns which are of approximately the same number.

5. The circuit arrangement of claim 4, wherein:
a respective balancing resistor is connected in parallel with a respective relay winding.

6. The circuit arrangement of claim 3, wherein:
said controllable switch comprises a semiconductor switch for switching unipolar currents; and
said current sensors comprise optocouplers including diode portions connected in the two-terminal networks and having emitter-collector paths connected in series with one another.

7. The circuit arrangement of claim 3, wherein:
said connecting two-terminal network of said second four-terminal network comprises a choke, a diode parallel current branch and a controllable switch comprising a diode parallel current branch.

8. The circuit arrangement of claim 1, wherein:
each of said two-terminal networks comprises a drop resistor connected in series with the respective current sensor and a voltage limiter connected in parallel to the series circuit of said current sensor and said drop resistor; and
the value of resistance of said drop resistor and the threshold of the voltage at which said voltage limiter takes effect a dimensioned such that the voltage limitation is effective at a nominal value of the remote feed current and is not yet effective at the lower limit value of the current which initiates the electronic switch to open the normally-closed contact.

9. The circuit arrangement of claim 8, wherein:
each of said drop resistors is dimensioned such that, at the response value of said electronic switch, the voltage drop at the series circuit is approximately equal to half the value of the threshold voltage of the voltage limiter.

10. The circuit arrangement of claim 9, wherein:
said first four-terminal network comprises a first relay including a winding in said first remote current feed path and a second relay including a winding in said second remote current feed path, each of said relays comprising a normally-closed contact connected across the respective current feed output; and
the response value of each of said relays being respectively dimensioned such that the relay operates in response to a current which is lower by a predetermined amount than the nominal value of the remote feed current.

* * * * *